United States Patent
Kang et al.

(10) Patent No.: US 8,027,682 B2
(45) Date of Patent: Sep. 27, 2011

(54) METHOD FOR SUPPORTING FAST BASE STATION SWITCHING IN A WIRELESS COMMUNICATION SYSTEM USING MULTIPLE FREQUENCY BANDS

(75) Inventors: Hyun-Jeong Kang, Seoul (KR); Hyoung-Kyu Lim, Seoul (KR); Jung-Je Son, Seongnam-si (KR); Yeong-Moon Son, Yongin-si (KR); Sung-Jin Lee, Seoul (KR); Jae-Hyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 671 days.

(21) Appl. No.: 12/079,283

(22) Filed: Mar. 26, 2008

(65) Prior Publication Data

US 2008/0242340 A1 Oct. 2, 2008

(30) Foreign Application Priority Data

Mar. 26, 2007 (KR) .......................... 10-2007-0029446
Apr. 20, 2007 (KR) .......................... 10-2007-0039064

(51) Int. Cl.
H04W 36/00 (2009.01)

(52) U.S. Cl. ........................................ 455/436; 370/331
(58) Field of Classification Search .......... 455/436–444; 370/331–334
See application file for complete search history.

(56) References Cited

U.S. PATENT DOCUMENTS

2005/0197133 A1* 9/2005 Hong et al. .................... 455/450
2005/0265223 A1* 12/2005 Song ............................. 370/208

* cited by examiner

Primary Examiner — Raymond Dean (57) ABSTRACT

A method for performing fast base station switching in an mobile station capable of using multiple frequency assignments in a wireless communication system are provided, in which initial network entry to a base station managing at least two frequency assignments is performed in one of the at least two frequency assignments, overlay mode support information and FA information about the at least two frequency assignments are acquired by the initial network entry, the overlay mode support information indicating whether the base station supports multiple frequency assignments, the base station is notified that the mobile station will operate in an overlay mode using multiple frequency assignments based on the acquired information, and signals are transmitted and received to and from the base station in the at least two frequency assignments.

12 Claims, 6 Drawing Sheets

METHOD FOR SUPPORTING FAST BASE STATION SWITCHING IN A WIRELESS COMMUNICATION SYSTEM USING MULTIPLE FREQUENCY BANDS

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Mar. 26, 2007 and assigned Serial No. 2007-29446 and a Korean Patent Application filed in the Korean Intellectual Property Office on Apr. 20, 2007 and assigned Serial No. 2007-39064, the entire disclosure of both of which is hereby incorporated by reference.

TECHNICAL FIELD OF THE INVENTION

The present invention generally relates to a wireless communication system using multiple frequency bands. More particularly, the present invention relates to a method for supporting Fast Base Station Switching (FBSS).

BACKGROUND OF THE INVENTION

Along with the development of wireless communication systems, more services and more service data are required. To meet the demands, a broadband wireless mobile communication system has emerged. However, due to limited frequency resources, the wireless mobile communication system has limited frequency bands. Accordingly, there exists a need for increasing frequency bands available for providing broadband services.

Figure 1:
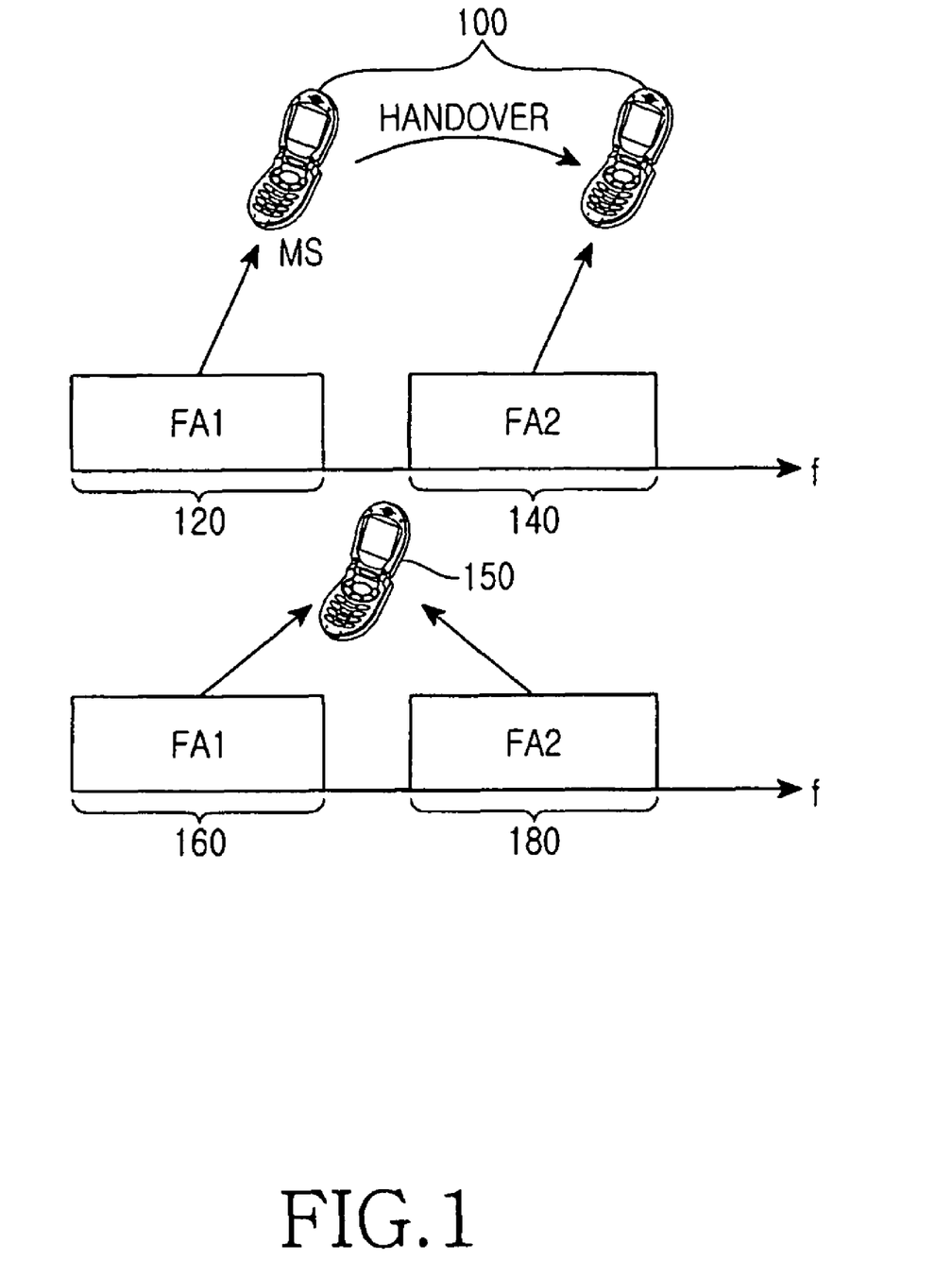
FIG. 1 illustrates a single-frequency band supporting structure and a two-frequency band supporting structure in a conventional wireless mobile communication system.

FIG. 1 illustrates a single-frequency band supporting structure and a two-frequency band supporting structure in a conventional wireless mobile communication system.

In a wireless mobile communication system, especially based on Institute of Electrical and Electronics Engineers (IEEE) 802.16, a base station (BS) manages one or more frequency assignments and provides a service to a mobile station (MS) in at least one of the frequency assignments.

Referring to FIG. 1, a mobile station (MS) 100 can switch from a first frequency assignment (FA) 120 (FA1) to a second frequency assignment (FA) 140 (FA2). If the MS 100 is limited to only one FA or different base stations manage the two FAs 120 and 140, the MS 100 receives a service in FA2 by an inter-FA handover.

If an MS 150 can operate in two or more FAs or the same base station (BS) manages two FAs 160 and 180 (FA1 and FA2), the MS 150 can receive a service in the FAs 160 and 180. In this manner, signal transmission and reception between an MS and a BS in multiple FAs is favorable for high-speed, large-data transmission and reception. However, a procedure for using multiple FAs between the MS and the BS is yet to be specified. Also, a technique for enabling the MS to fast switch from a current FA to a new FA or from a serving BS to another BS is to be developed.

SUMMARY OF THE INVENTION

To address the above-discussed deficiencies of the prior art, it is a primary aspect of exemplary embodiments of the present invention is to address at least the problems and/or disadvantages and to provide at least the advantages described below. Accordingly, an aspect of exemplary embodiments of the present invention is to provide a method for using multiple frequency bands in a wireless communication system.

Another aspect of exemplary embodiments of the present invention provides a method for supporting fast base station (BS) switching or fast frequency band switching in a wireless communication system using multiple frequency bands.

In accordance with an aspect of exemplary embodiments of the present invention, there is provided a method for performing fast base station switching in a mobile station (MS) capable of using multiple frequency assignments in a wireless communication system, in which initial network entry to a base station managing at least two frequency assignments is performed in one of the at least two frequency assignments, overlay mode support information and frequency assignment (FA) information about the at least two frequency assignments are acquired by the initial network entry, the overlay mode support information indicating whether the base station supports multiple frequency assignments, the base station is notified that the mobile station will operate in an overlay mode using multiple frequency assignments based on the acquired information, and signals are transmitted and received to and from the base station in the at least two frequency assignments.

In accordance with another aspect of exemplary embodiments of the present invention, there is provided a method for performing fast base station switching in a mobile station capable of using multiple frequency assignments in a wireless communication system having base stations each managing at least two frequency assignments, in which neighbor base station information including a frequency assignment (FA) list of a neighbor base station is received from a serving base station, total frequency assignments are scanned using the FA list, a target frequency assignment is determined according to a result of the scanning, a switch indication including information about the selected target frequency assignment is transmitted to the serving base station, the target frequency assignment is switched to, overlay mode information is received in the target frequency assignment, a base station managing the target frequency assignment is notified that the mobile station will operate in an overlay mode, and signals are transmitted and received in the target frequency assignment and another frequency assignment of the base station managing the target frequency assignment.

In accordance with a further aspect of exemplary embodiments of the present invention, there is provided a method for supporting fast base station switching in a serving base station that provides a service to a mobile station in a wireless communication system having base stations each managing at least two frequency assignments, in which frequency assignment (FA) lists are exchanged with neighbor base stations, neighbor base station information including the FA lists is transmitted to the mobile station, information indicating whether the mobile station supports an overlay mode and information about a service level that the mobile station wants are exchanged with the neighbor base stations, and upon receipt of a switch indication including a target frequency assignment from the mobile station, a base station managing the target frequency assignment is notified of the target frequency assignment.

In accordance with still another aspect of exemplary embodiments of the present invention, there is provided a method for supporting fast base station switching in a neighbor base station in a wireless communication system having base stations each managing at least two frequency assignments, in which frequency assignment (FA lists are exchanged with a serving base station and other neighbor base stations, a signal indicating that a mobile station will perform fast base station switching to a target frequency assignment managed by the neighbor base station is received from the serving base station, switching is performed with the mobile station in the target frequency assignment, overlay mode information is transmitted to the mobile station in the target frequency assignment, the overlay mode information including information about a primary frequency assignment and a secondary frequency assignment for use in signal transmission and reception to and from the mobile station, and signals are transmitted to and from the mobile station in the primary frequency assignment and the secondary frequency assignment.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a method for supporting fast base station switching (FBSS) in a wireless mobile communication system using multiple frequency bands. The frequency bands can be frequency assignments. Herein, "overlay mode" is defined as a mode in which data can be transmitted and received between a mobile station (MS) and a base station (BS) in multiple frequency bands (i.e., frequency assignments). While the present invention is described in the context of an IEEE 802.16 communication system, it is to be clearly understood that it is also applicable to other communication systems including Mobile Worldwide Interoperability for Microwave Access (WiMAX).

Figure 2:
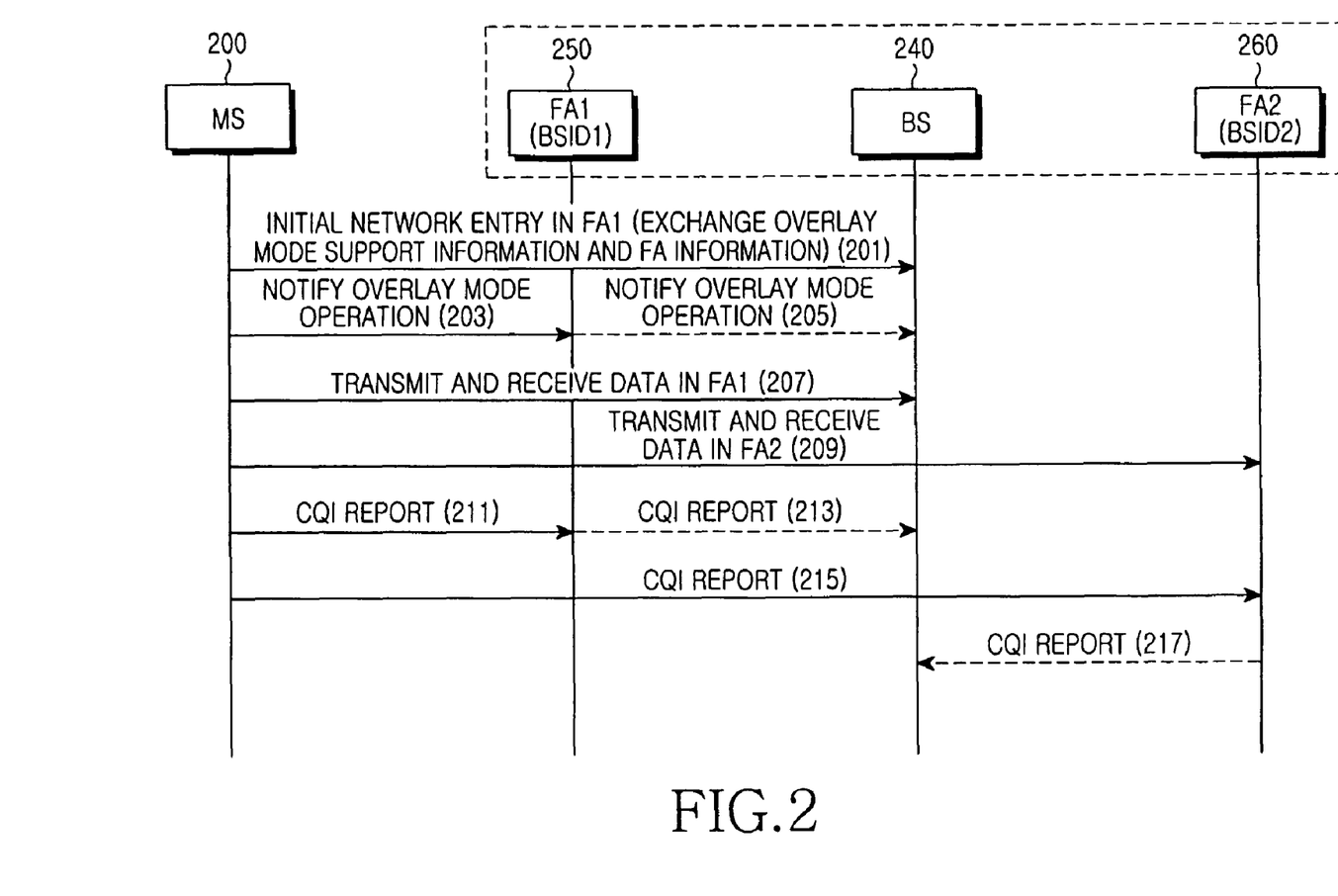
FIG. 2 is a diagram illustrating a signal flow for an overlay mode supporting procedure according to an exemplary embodiment of the present invention.

FIG. 2 is a diagram illustrating a signal flow for an overlay mode supporting procedure according to an exemplary embodiment of the present invention.

Referring to FIG. 2, a base station (BS) 240 manages a first frequency assignment (FA) 250 (FA1) having a first base station identifier (BSID1) and a second FA 260 (FA2) having a second base station identifier (BSID2). A mobile station (MS) 200 performs initial network entry to the BS 240 in FA1 in step 201. By the initial network entry, the MS 200 can acquire overlay mode support information and FA information. The initial network entry will be detailed below.

The MS 200 acquires synchronization to the BS 240 in FA1 and then performs initial ranging to the BS 240 by exchanging ranging messages.

The MS 200 transmits a Subscriber Basic Capability REQuest (SBC-REQ) message to the BS 240. The SBC-REQ message may include information about whether the MS 200 supports the overlay mode and information indicating the maximum number of supported FAs in the overlay mode. The information can be included in a REGistration-REQuest (REG-REQ) message used during registration, instead of the SBC-REQ message.

The BS 240 replies to the MS 200 with a Subscriber Basic Capability ReSPonse (SBC-RSP) message for the SBC-REQ message. The SBC-RSP message may include information about whether the BS 230 supports the overlay mode and information indicating the number of FAs supported by the BS 240. The SBC-RSP message may further include information about the indexes of all FAs managed by the BS 240 and center frequency and synchronization information about each FA, or only information about as many FAs as supported for the MS 200.

Instead of the SBC-RSP message, the above information can be transmitted in a REGistration-ReSPonse (REG-RSP) message used during the registration. Then the BS 240 and the MS 200 perform authentication and registration.

After completing the initial network entry, the MS 200 transmits in FA1 to the BS 240 an overlay mode notification signal indicating that it will operate in the overlay mode in steps 203 and 205. Since both the MS 200 and the BS 240 support the overlay mode, the MS 200 is aware that the overlay mode is available and transmits the overlay mode notification signal to the BS 240 in FA1. The overlay mode notification signal can be a Bandwidth Request (BR) header with a BR field set to '0' or a separately procured Medium Access Control (MAC) control message.

While the MS 200 notifies the BS 240 that it will operate in the overlay mode after the initial network entry in the above description, it can notify the BS of an overlay mode start time during the initial network entry.

In the illustrated case of FIG. 2, the MS 200 notifies the BS 240 of the overlay mode operation in FA1 in steps 203 and 205. Yet, it can be further contemplated that the MS 200 notifies the BS 240 of the overlay mode operation in FA2 after raging in FA2. In this case, data transmission and reception between the MS 200 and the BS 240 may be in progress in FA1. When the MS 200 determines that data transmission and reception in FA2 is possible, it can notify the BS 240 of the overlay mode operation. For example, upon successful completion of the ranging to the BS 240 in FA2, the MS can notify the BS 240 that it will operate in the overlay mode.

In steps 207 and 209, the MS 200 and the BS 240 transmit and receive data with each other in FA1 and FA2.

Meanwhile, the BS 240 can allocate a Channel Quality Information (CQI) channel in FA1 to the MS 200 in order to determine the channel statuses of FA1 and FA2 of the MS 200. The MS 200 reports the channel qualities of FA1 and FA2 on the allocated CQI channel in steps 211 to 217. The MS 200 may transmit an FBSS-related signal on the CQI channel and may report the CQIs in a MAC control message without being allocated the CQI channel, which will be described in detail with reference to FIG. 3.

Figure 3:
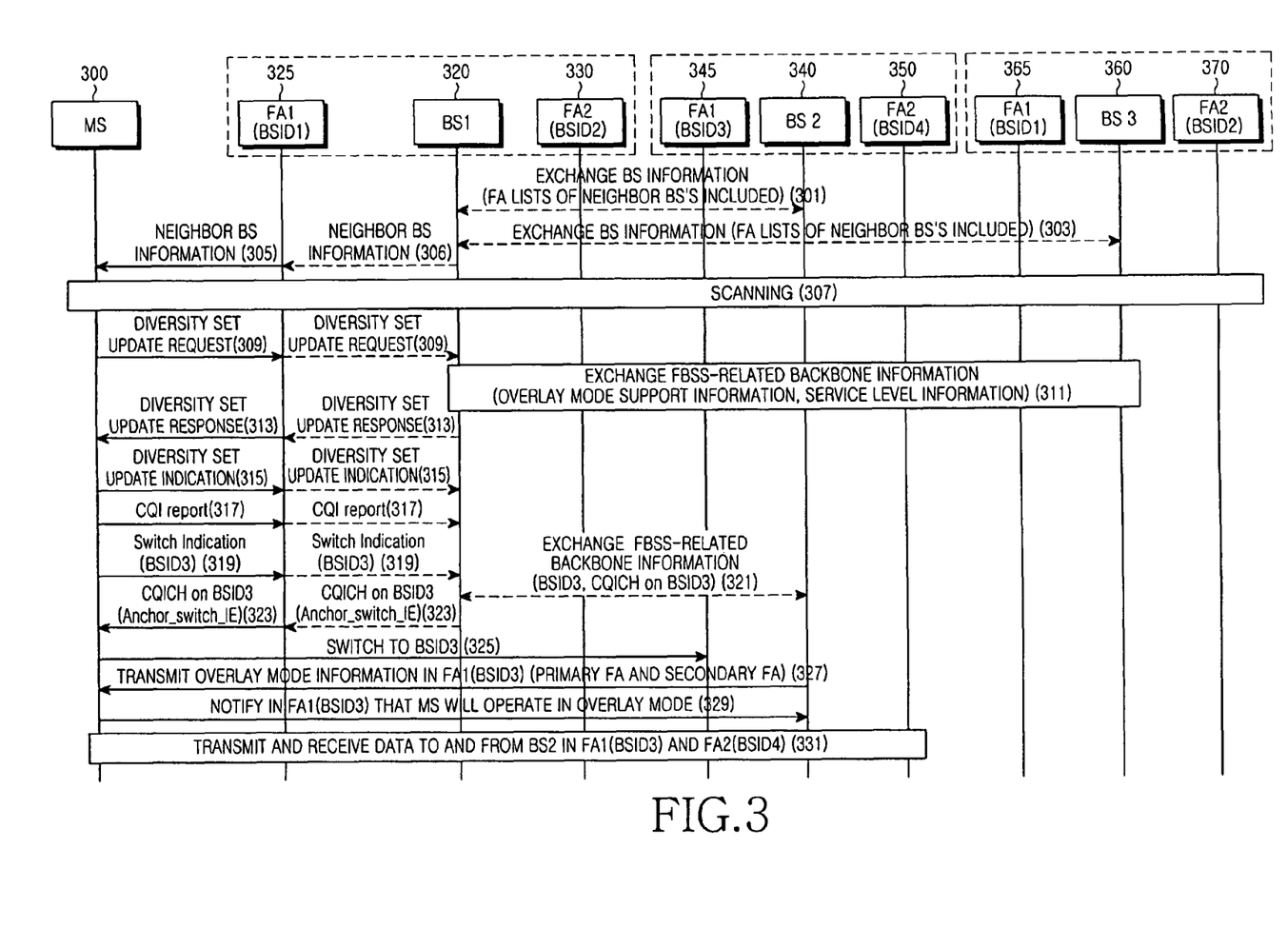
FIG. 3 is a diagram illustrating a signal flow for an FBSS supporting procedure in a multiple-FA system according to another exemplary embodiment of the present invention.

FIG. 3 is a diagram illustrating a signal flow for an FBSS supporting procedure in a multiple-FA system according to another exemplary embodiment of the present invention.

Referring to FIG. 3, an MS 300 belongs to a first BS 320 (BS1), which is thus a serving BS, and BS 1 manages two FAs. Second and third BSs 340 and 360 (BS2 and BS3) are neighbor BSs to BS1, each managing two FAs.

BS1 exchanges BS information periodically with BS2 340 and BS3 360 in steps 301 and 303. The BS information includes an FA list of the BS that has transmitted the BS information. The FA list lists the indexes and center frequencies of FAs.

In step 305, the BS1 transmits neighbor BS information in a first FA (FA1) 325 to the MS 300. The neighbor BS information also includes information about the BS1.

The MS 300 scans BS1 320, BS2 340 and BS3 360 by measuring the signal strengths of BS1 320, BS2 340 and BS3 360 based on the neighbor BS information in step 307. The scanning results can be Signal-to-Noise Ratios (SNRs). In step 309, the MS 300 transmits a diversity set update request message to the BS1 320 according to the scanning results. The diversity set update request message includes FAs that the MS 300 wants to include in its diversity set. Hence, a plurality of FAs managed by the same or different BSs can be included in the diversity set update request message. Also, the BS can request the diversity update to the MS and the BS-initiated diversity update is performed in a similar manner to the MS-initiated diversity update.

Upon receipt of the diversity set update request message, the BS1 320 exchanges FBSS-related backbone information with neighbor BSs managing the FAs included in the diversity set update request message in step 311. The FBSS-related backbone information includes information indicating whether the MS 300 can support the overlay mode, the maximum number of FAs available to the MS 300, and service level information for the MS. The FBSS-related backbone information may further include information about a CQI channel to be allocated to the MS 300. The service level information indicates a service level that the MS 300 can achieve when BS1 transmits data in all FAs used for communications with the MS 300 and service levels that the MS 300 can achieve when BS2 340 and BS3 360 transmit data in all FAs that they can support for the MS 300.

In step 313, the BS1 320 transmits a diversity set update response message to the MS 300 in FA1 325. The MS 300 transmits in FA1 325 to the BS1 320 a diversity set update indication message indicating that the diversity set has been updated in step 315.

Meanwhile, if the diversity set update request message includes information about a plurality of FAs managed by each of BS1 320, BS2 340 and BS3 360, the BS1 320 selects one FA per BS and includes the selected FAs in the diversity set update response message.

In step 317, the MS 300 reports the CQIs of the FAs included in the diversity set to the BS1 320 on a CQI channel allocated by FA1 325. If the MS 300 determines that it needs to switch to one of the FAs included in the diversity set as a result of monitoring the FAs, it transmits a switch indication message to the BS1 320 on the CQI channel in step 319. Herein, it is assumed that the MS 300 wants to switch to a first FA (FA1) 345 of BS2, having a third BSID (BSID3). Hence, the switch indication message includes BSID3.

The BS1 320 notifies the BS2 340 that the MS 300 will switch to FA1 345 with BSID3 over a backbone network in step 321. If a CQI channel for use in communications by FA1 345 having BSID3 has not been allocated to the MS 300 yet, the BS1 320 acquires information about the CQI from the BS2 340 and transmits the CQI channel information to the MS 300 by Anchor_Switch_IE in step 323. The structure of Anchor_Switch_IE is disclosed in an IEEE 802.16 standard document.

In step 325, the MS 300 switches to FA1 345 of the BS2 340. The BS2 transmits overlay mode information to the MS 300 in FA1 345 in step 327. The overlay mode information provides at least one of information indicating whether the BS2 will use the overlay mode, information about a primary FA and second FAS when the overlay mode is supported, information about the number of FAs to be used in the overlay mode, information about the indexes and center frequencies of the FAs, and information about a start frame in which the overlay mode will start. The overlay mode information is delivered to the MS 300 in an extended subheader or a MAC control message. The primary FA is FA1 345 of the BS2 340. If the BS2 340 manages at least three FAs, the number of secondary FAs will increase.

The MS 300 notifies the BS2 340 that it will operate in the overlay mode by transmitting a BR header with a BR field set to 0 or a MAC control message in FA1 345 in step 329. Then the MS 300 transmits and receives data to and from the BS2 340 in FA1 345 and a second FA (FA2) 350 in step 331.

While the MS 300 notifies BS2 that it will operate in the overlay mode in FA1 345 of BS2 in step 329, it can be further contemplated that the MS 300 notifies the BS2 340 of the overlay mode operation in FA2 350 or any other secondary FA of the BS2 340. In this case, the MS 300 performs ranging to the BS2 340 in FA2 350 or any other secondary FA when needed. Upon successful completion of the ranging, the MS 300 can notify the BS2 340 of the overlay mode operation in FA2 or any other secondary FA. In this case, data transmission and reception between the MS 300 and the BS2 340 may be in progress in FA1.

Meanwhile, if the MS 300 wants to switch to a second FA (FA2) 330 of the BS1 320, that is, a secondary FA of BS1, or if switching between a primary FA and a secondary FA is required within BS1, BS1 can re-establish a data path to the MS 300 in the primary FA or the secondary FA. That is, when FA2 330 is set as the primary FA of the MS 300 in FIG. 3, the data path established in the old primary FA (i.e., FA1 325) is released and a data path is established in FA2 330. Or instead of establishing the data path in FA2 330, a connection in FA2 330 can be provided by utilizing the data path in FA1 325.

Figure 4:
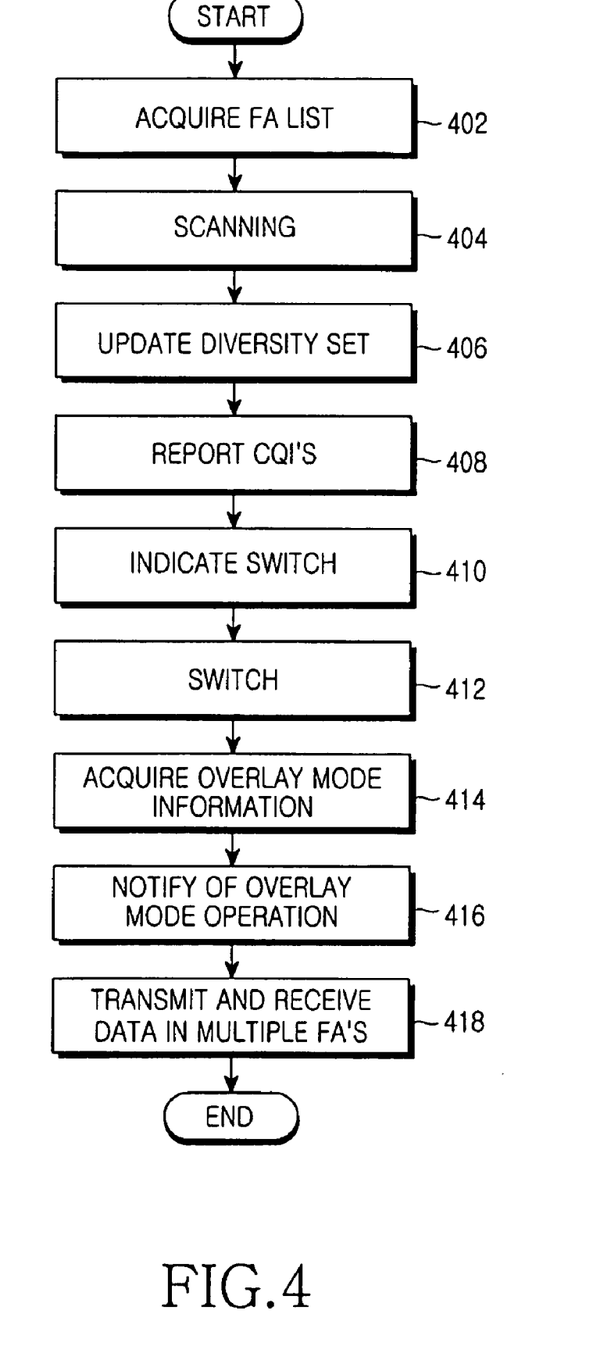
FIG. 4 is a flowchart illustrating an FBSS operation of an MS according to the present invention.

FIG. 4 is a flowchart illustrating an FBSS operation of an MS according to the present invention.

Referring to FIG. 4, the MS acquires an FA list from its serving BS in step 402. The FA list includes information about the indexes and center frequencies of FAs. The MS scans the FAs in step 404 and updates a diversity set by a diversity set updating procedure with the serving BS in step 406. The diversity set updating procedure can be requested by the MS or the BS.

In step 408, the MS reports the CQIs of the FAs to the serving BS. The MS indicates connection switching to a target BS to the serving BS in step 410. The target BS can be the serving BS or a neighbor BS of the serving BS. In step 412, the MS switches to the target BS, that is, it performs an FBSS.

The MS receives overlay mode information from the target BS in step 414 and notifies the target BS that it will operate in the overlay mode in step 416. In step 418, the MS transmits and receives data in a plurality of FAs managed by the target BS.

Figure 5:
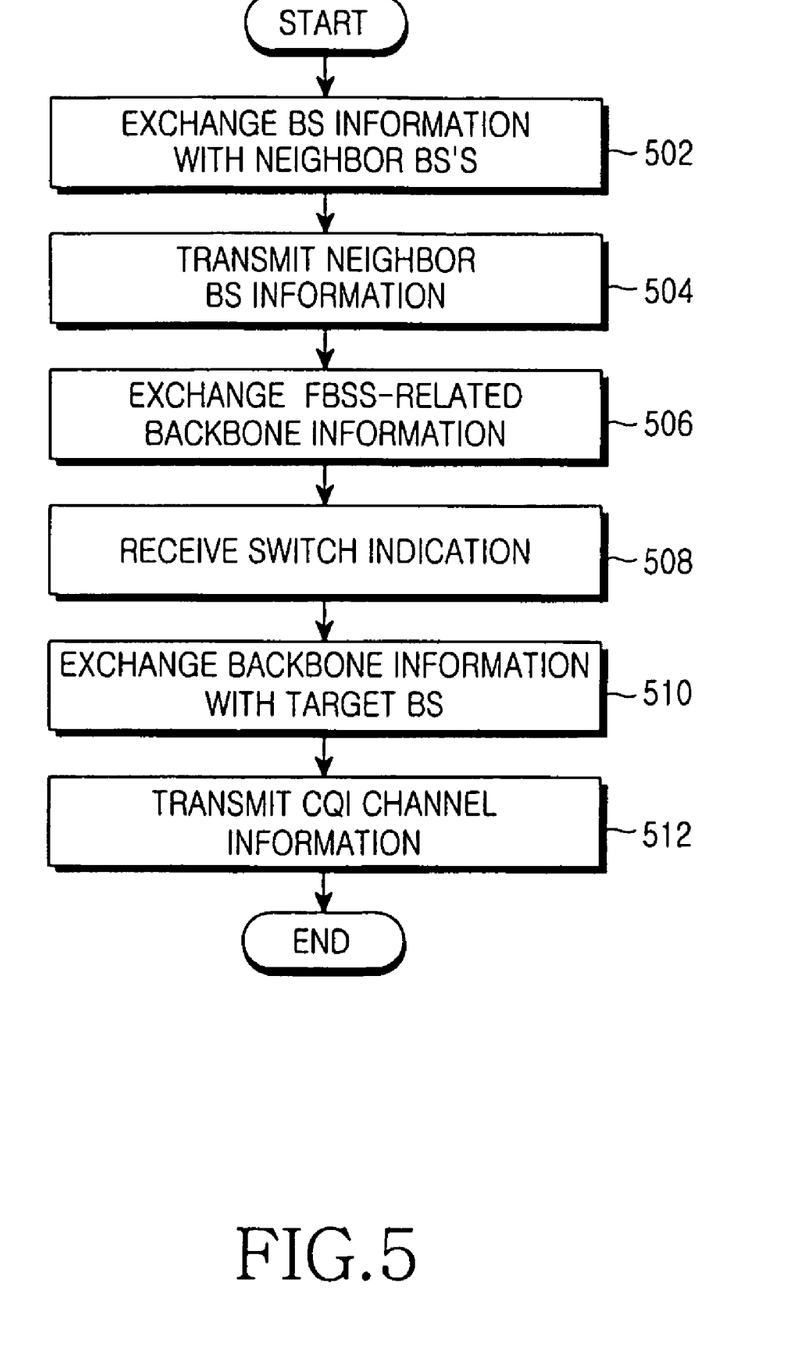
FIG. 5 is a flowchart illustrating an FBSS-related operation of a serving BS according to the present invention.

FIG. 5 is a flowchart illustrating an FBSS-related operation of a serving BS according to the present invention.

Referring to FIG. 5, the serving BS exchanges BS information with neighbor BSs in step 502. The neighbor information includes the FA list of each BS. The serving BS transmits neighbor BS information including the FA lists in step 504. If the serving BS receives a diversity set update request from the MS or it transmits the diversity set update request to the MS, it exchanges FBSS-related backbone information with the neighbor BSs in step 506.

Upon receipt of a switch indication indicating switching to a particular target BS from the MS in step 508, the serving BS exchanges FBBS-related backbone information with the target BS in step 510 and transmits information about a CQI channel allocated by the target BS to the MS in step 512.

Figure 6:
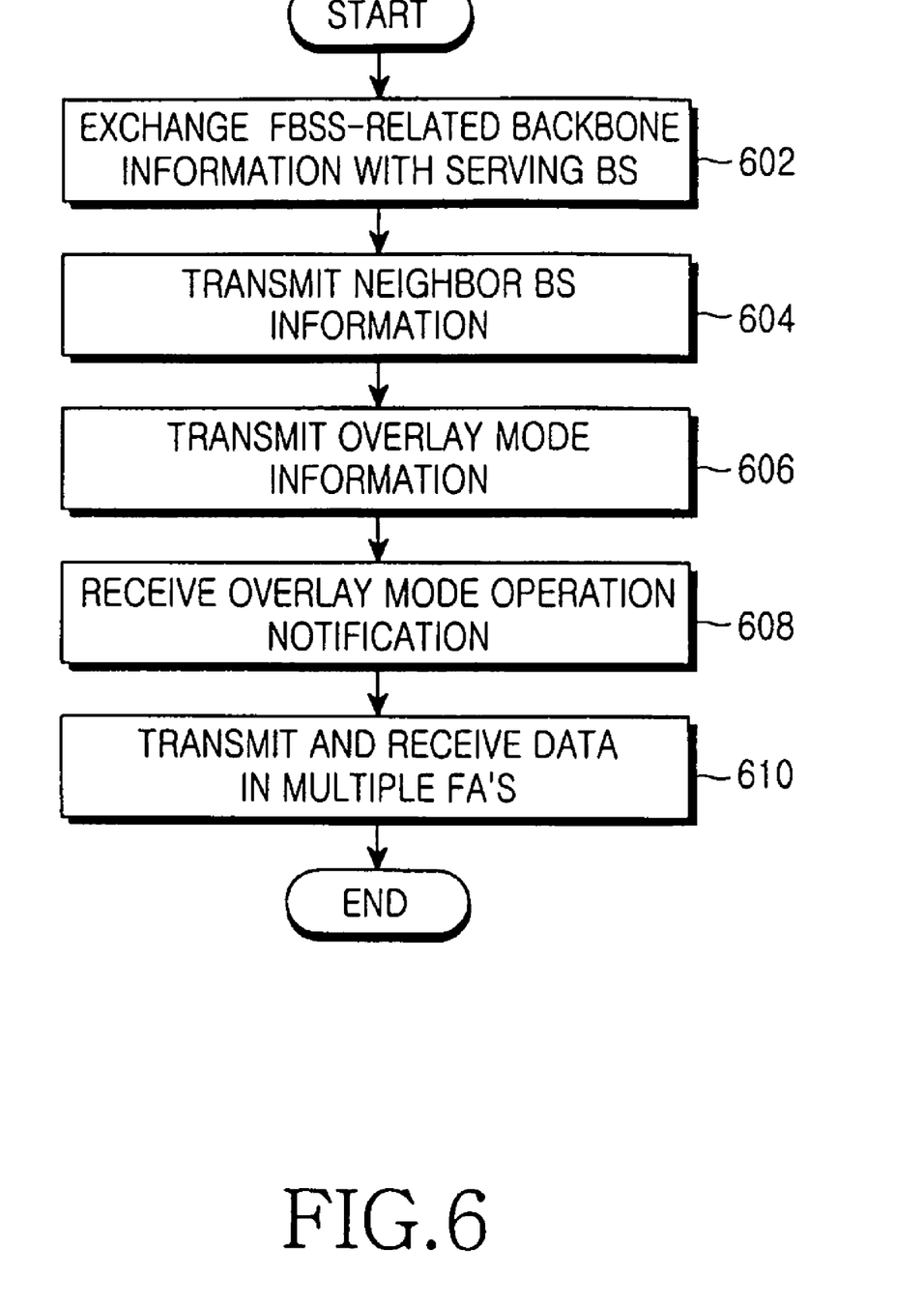
FIG. 6 is a flowchart illustrating an FBSS-related operation of an FBSS-target BS according to the present invention.

FIG. 6 is a flowchart illustrating an FBSS-related operation of an FBSS-target BS according to the present invention.

Referring to FIG. 6, the target BS exchanges FBSS-related backbone information with a serving BS in step 602. The FBSS-related backbone information may include overlay mode support information and service level information. The target BS performs switching with an MS in a primary FA, FA1 in step 604 and transmits overlay mode information to the MS in step 606. In step 608, the target BS is notified from the MS that the MS will operate in the overlay mode. The target BS transmits and receives data to and from the MS in the primary FA and a secondary FA in step 610.

As is apparent from the above description, the present invention advantageously enables seamless service provisioning by supporting FBSS for an MS in a wireless communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing fast base station switching in a mobile station capable of using multiple frequency assignments in a wireless communication system, the method comprising:
performing initial network entry in one of at least two frequency assignments managed by a base station;
acquiring overlay mode support information and frequency assignment (FA) information about the at least two frequency assignments during the initial network entry, the overlay mode support information indicating whether the base station supports multiple frequency assignments;
notifying the base station that the mobile station will operate in an overlay mode using multiple frequency assignments concurrently based on the acquired information; and
transmitting and receiving signals in the at least two frequency assignments concurrently to and from the base station,
wherein the notification comprises notifying the base station that the mobile station will operate in the overlay mode by a bandwidth request header message with a bandwidth request field set to 0.

2. The method of claim 1, wherein the frequency assignment information includes at least one of information about the number of frequency assignments that the base station can support and center frequency and synchronization information of each of the frequency assignments.

3. The method of claim 1, wherein the notification is performed during the initial network entry.

4. A method for performing fast base station switching in a mobile station capable of using multiple frequency assignments in a wireless communication system having base stations each managing at least two frequency assignments, the method comprising:
receiving neighbor base station information including a frequency assignment (FA) list of a neighbor base station from a serving base station;
scanning total frequency assignments using the FA list;
determining a target frequency assignment according to a result of the scanning and transmitting a switch indication including information about the selected target frequency assignment to the serving base station;
switching to the target frequency assignment;
receiving overlay mode information in the target frequency assignment;
notifying a base station managing the target frequency assignment that the mobile station will operate in an overlay mode; and
transmitting and receiving signals in the target frequency assignment and another frequency assignment of the base station managing the target frequency assignment.

5. The method of claim 4, further comprising updating a diversity set according to the scanning result.

6. The method of claim 4, wherein the overlay mode information includes at least one of information indicating whether the base station managing the target frequency assignment will use multiple frequency assignments, information about a primary frequency assignment and a secondary frequency assignment when the overlay mode is supported, the number of frequency assignments to be used in the overlay mode, indexes and center frequencies of the frequency assignments, and information about a frame in which the overlay mode will start.

7. The method of claim 6, wherein the primary frequency assignment is the target frequency assignment and the secondary frequency assignment is the another frequency assignment.

8. The method of claim 4, wherein the notification comprises notifying the base station managing the target frequency assignment that the mobile station will operate in the overlay mode by a bandwidth request header message with a bandwidth request field set to 0.

9. A method for supporting fast base station switching in a serving base station that provides a service to a mobile station in a wireless communication system having base stations each managing at least two frequency assignments, the method comprising:
exchanging frequency assignment (FA) lists with neighbor base stations;
transmitting neighbor base station information including the FA lists to the mobile station;
exchanging information indicating whether the mobile station supports an overlay mode and information about a service level that the mobile station wants with the neighbor base stations; and notifying, upon receipt of a switch indication including a target frequency assignment from the mobile station, a base station managing the target frequency assignment of the target frequency assignment.

10. The method of claim 9, wherein the exchange is performed after receiving a diversity set update request from the mobile station or after requesting a diversity set update to the mobile station.

11. A method for supporting fast base station switching in a neighbor base station in a wireless communication system having base stations each managing at least two frequency assignments, the method comprising:

exchanging frequency assignment lists with a serving base station and other neighbor base stations;

receiving from the serving base station a signal indicating that a mobile station will perform fast base station switching to a target frequency assignment managed by the neighbor base station;

performing switching with the mobile station in the target frequency assignment;

transmitting overlay mode information to the mobile station in the target frequency assignment, the overlay mode information including information about a primary frequency assignment and a secondary frequency assignment for use in signal transmission and reception to and from the mobile station; and transmitting and receiving signals to and from the mobile station in the primary frequency assignment and the secondary frequency assignment.

12. The method of claim 11, wherein the overlay mode information includes at least one of information indicating whether the base station managing the target frequency assignment will use multiple frequency assignments, information about the primary frequency assignment and the secondary frequency assignment when the overlay mode is supported, the number of frequency assignments to be used in the overlay mode, indexes and center frequencies of the frequency assignments, and information about a frame in which the overlay mode will start.

* * * * *